INVENTOR:
JAMES F. BOLTON
BY
ATTORNEYS

United States Patent Office 3,284,058
Patented Nov. 8, 1966

3,284,058
SURFACE AERATION OF LIQUIDS
James F. Bolton, Heywood, England, assignor to Ames Crosta Mills, & Company Limited, a corporation of Great Britain, Northern Ireland and Isle of Man
Filed Feb. 8, 1965, Ser. No. 430,943
Claims priority, application Great Britain, Feb. 7, 1964, 5,213/64
4 Claims. (Cl. 259—102)

This invention relates to the surface aeration of liquids, and is particularly, though not exclusively, concerned with the circulating and aerating plant used in the activated-sludge treatment of sewage.

In known plants for the purpose aforesaid, a ring of blades is mounted for rotation about a vertical axis, and in partially-submerged condition, in a tank, and commonly such blades are carried by an inverted truncated cone arranged at the top of a stationary uptake tube whose lower end is supported clear of the tank bottom.

For large installations, at least one row of such tanks, opening one into another so as collectively to form a single aeration channel, is spanned lengthwise by a central bridge which has the several rotary aerators suspended therefrom and each driven through enclosed bevel gearing from overhead line-shafting with an electric motor at one end.

The body of each weatherproof gearhead is bolted to a permanent seating on the bridge, a long trunk thereon depending through an opening in such bridge and being provided with upper and lower bearings for the vertical shaft to which is fixed a driving ring connected by angularly-spaced adjustable stays to the aerator itself.

In the first instance, each gearhead shaft requires very careful alignment with the uptake tube below, especially when the aerator blades are mounted upon a truncated cone whose inner periphery is to make a running joint with such tube, and in the event of such gearhead requiring replacement great difficulty has hitherto been experienced in disconnecting it from the aerator, since this operation necessitates a workman standing on a staging slung beneath the bridge and reaching through the spokes of the driving ring to the securing means associated with the hub of the latter.

The object of the present invention is to facilitate and expedite the disconnection of any type of rotary aerator from its driving means, and hence to simplify the task of maintaining the complete aeration plant in efficient condition.

According to this invention, the vertical driving shaft for the (or each) rotary aerator is connected thereto, not directly, but through the medium of a hollow extension with end flanges which are bolted respectively to a half-coupling on the driving shaft and to the centre of the driving ring or its equivalent.

The advantages of the invention aforesaid are most fully realized when the conventional line-shafting is replaced by individual motor drives for the several aerators, in which case a gearbox associated with each motor may be provided around its output shaft with a concentric spigot adapted for location in the bridge opening or in an annular baseplate previously fixed around such opening in accurate relation to the adjacent uptake tube (if any).

The mounting or dismounting of any one of the geared motor units aforesaid (or alternatively of a gearhead previously disconnected from the line-shafting) is preferably affected by means of lifting tackle suspended from a wheeled carriage which is designed for movement along the bridge, the connection or disconnection of the driving shaft from the aerator being affected at the upper coupling of the extension shaft while the aerator is suspended with such coupling above the level of the bridge platform.

Where the width of the bridge permits, the wheeled carriage may be designed to allow lateral movement of the lifting tackle into and out of the travelling position in which a geared-motor unit or gearhead hanging therefrom will clear other units still in operation on the bridge.

To facilitate guidance of the wheeled carriage along such bridge, the latter may be made of channel section and the carriage provided with running and guiding wheels respectively engaging the tops and sides of the channel walls.

Figure 1:
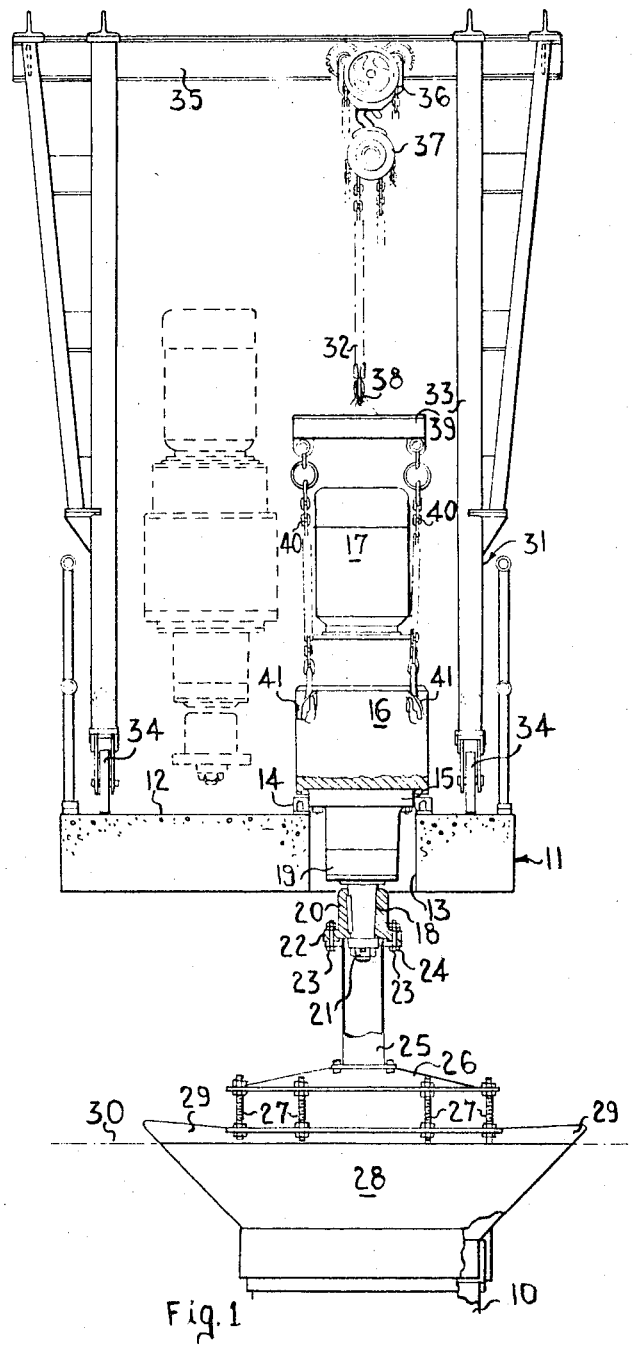
FIG. 1 is a cross-section through the bridge of a surface-aeration plant, showing in end elevation one form of the handling carriage aforesaid arranged ready for the separation of a geared-motor unit of such plane from the associated aerator.
Figure 2:
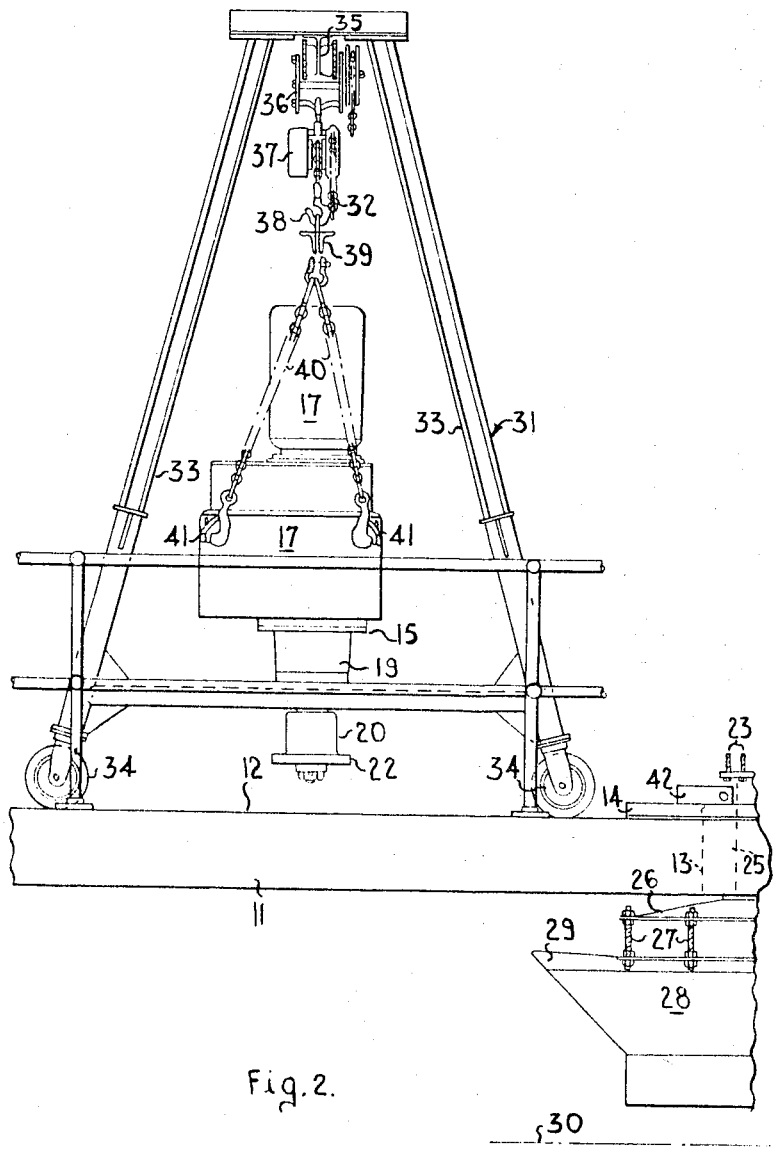
FIG. 2 is a side elevation of the handling carriage with the detached geared-motor unit hanging therefrom and the aerator left suspended from the bridge.

In the example illustrated on FIGS. 1 and 2, the invention is assumed to be applied to a plant in which each of a row of inter-communicating tanks collectively comprising a single aeration channel (not shown) is provided with a stationary central uptake tube 10.

The whole row of tanks is spanned lengthwise by a centrally-arranged bridge 11 conveniently formed of reinforced concrete and having a flat platform 12 with a circular opening 13 (say, 17 inches in diameter) left therein directly above each of the several uptake tubes 10.

Around the upper edge of each opening 13 is fixed an annular baseplate 14, preferably of inverted channel section, which may be provided with adjusting screws to facilitate the setting thereof in an accurately horizontal plane prior to being rag-bolted and grouted in position with its centre on the produced axis of the adjacent uptake tube 10.

This annular baseplate 14 serves to locate a spigot 15 at the lower end of a vertical-mounting gearbox 16 upon which is superimposed a coaxial electric motor 17, such gearbox being bolted to the baseplate 14 and having its output shaft 18 journalled in a housing 19 which projects into or slightly through the opening 13 in the bridge platform 12.

The output shaft 18 has its extremity tapered to receive a half-coupling 20 which is keyed in place and retained by lock-nuts 21, a peripheral flange 22 on this coupling being bolted at 23 to another flange 24 welded to the top of a tubular steel extension shaft 25 (say, 20 inches long overall) whose lower end is similarly connected to the inner periphery of a domed steel driving disc 26.

The latter forms an advantageous substitute for the conventional spoked cast-iron driving ring and its periphery has suspended therefrom, by a plurality of (say, six) adjustable stays 27, a rotary aerating cone 28 which may be of well-known type provided with internal blades 29 and making an airtight junction at its inner periphery with the top of the uptake tube 10.

In this way, the aerating cone 28 is maintained in accurate concentricity with the uptake tube 10 and with its lip slightly above the static level 30 of liquid in the tank, so that during its rotation such liquid is distributed over the surface after being drawn up the tube 10 and thrown centrifugally by the blades 29.

For use in lifting the geared-motor unit 16, 17 to allow its replacement or overhaul after disconnection from the aerating cone 28, there is provided a wheeled carriage 31 capable of being trundled along the bridge 11 to the required position and equipped with chain tackle 32 of appropriate capacity.

In the preferred construction shown, this lifting carriage 31 comprises triangular side frames 33 with running wheels 34 mounted at their lower corners, their apices being joined by an I-beam 35 on which runs a roller trolley 36, providing an anchorage for the pulley block 37 of the chain tackle 32.

The load hook 38 of the latter carries a lifting beam 39 from which depend four chains 40 adapted to be hooked to angularly spaced lugs 41 on the gearbox 16.

The opening 13 in the bridge platform 12 allows the passage therethrough of the coupling 22, 24 between the extension shaft 25 and the geared-motor unit 16, 17 when the latter, after detachment from its baseplate 14, is lifted by means of the chain tackle 32.

The exterension shaft 25, still connected to the aerating cone 28, can then be supported in its raised position by insertion of suitable packing between its top flange 24 and the upper surface of the baseplate 14, such packing conveniently comprising a simple pipe-clamp 42 engaging the exposed part of the shaft 25.

Under these conditions, it is a simple matter to remove the nuts from the upper coupling bolts 23, which remain in the shaft flange 24, and to continue the lifting of the geared-motor unit 16, 17 until the half-coupling 20 thereof is clear of these bolts, where upon the roller trolley 37 to which the lifting tackle 32 is anchored can be moved across the carriage 31 to a travelling position (shown in broken lines on FIG. 1) in which the suspended unit 16, 17 will pass clear of other units on the bridge 11 when the carriage 31 is moved along the latter.

When the bridge 11 is flat-topped, the carriage 31 may have resilient-tyred wheels 34, two of these preferably being castor-mounted to facilitate guiding of the carriage along the bridge 11, or alternatively the latter may have steel guide rails fixed thereto for engagement by flanged wheels on the carriage 31.

Figure 3:
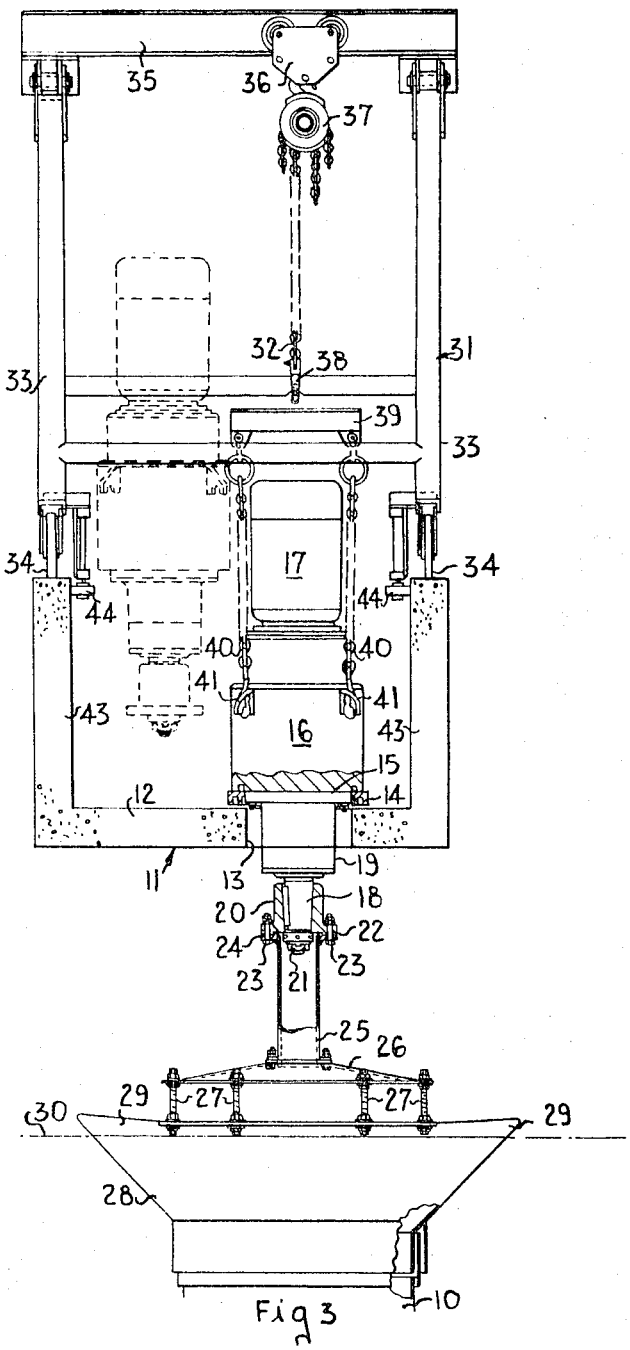
FIG. 3 is a view corresponding to FIG. 1, but showing a modified construction.
Figure 4:
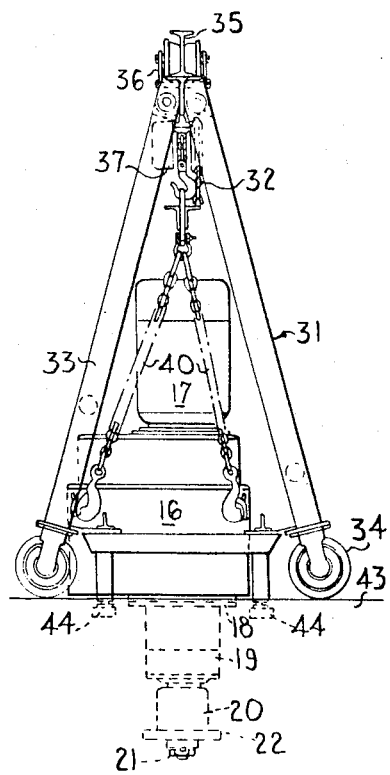
FIG. 4 is a side elevation of the carriage illustrated in FIG. 3.

Yet another alternative arrangement is to employ a channel-section bridge 11 as shown in FIG. 3 and to provide the carriage 31 with resilient-tyred wheels 34 which run directly upon the tops of its side walls 43, lateral guidance being effected by horizontal rollers 44 suitably bracketed to the side frames 33 of the carriage so as to engage the inner faces of the bridge walls 43.

It will be appreciated that when using conventional line-shafting and gearheads, the latter may have their output shafts connected to the aerating cones 28 by hollow extension shafts 25 in the manner above described, so that any one such gearhead can be disconnected and removed after separation from the adjacent line-shaft sections which can of course be temporarily joined by a filling piece to allow the rest of the row of cones 28 to remain in operation.

Furthermore, although the invention has been particularly described hereinbefore with reference to a construction in which each gearbox 16 or gearhead rests upon an adjustable baseplate such as 14, it should be understood that, if desired this baseplate may be omitted and the gearbox or gearhead provided with adjusting screws so that it can seat directly upon the edge of the platform 13.

I claim:
1. Apparatus for the surface aeration of liquids, comprising a tank for containing the liquid under treatment; a submerged uptake tube mounted vertically in said tank, a platform above said tank and having a circular opening therein directly above said uptake tube; an annular baseplate mounted on said platform around said opening and adjustable with reference to said uptake tube; a drive unit supported on said baseplate; a dependant spigot on said drive unit located on said baseplate; a vertical output shaft extruding from said drive unit and through said opening in concentricity with said spigot; a hollow extension detachably coupled to said shaft at a position normally beneath said platform; a circular plate fixed at its centre to said extension; a rotary aerator suspended from said plate in coaxial relation with said shaft and partially submerged in the liquid under treatment.

2. Apparatus for the surface aeration of liquids, comprising a tank for containing the liquid under treatment; a platform above said tank and having a circular opening therein; a drive unit supported on said platform; a dependant spigot on said drive unit located in said opening; a vertical output shaft extending from said drive unit and through said opening in concentricity with said spigot; a hollow extension detachably coupled to said shaft at a position normally beneath said platform; a circular plate fixed at its centre to said extension; a rotary aerator suspended from said plate in coaxial relation with said shaft and partially submerged in the liquid under treatment; a wheeled carriage movable along said platform and across said opening; lifting tackle suspended from said carriage and attachable to said drive unit to allow said unit to be lifted until said output shaft can be uncoupled from said extension above the level of said platform; and means for temporarily suspending said uncoupled extension and associated aerator from said platform during removal of the lifted drive unit by movement of said carriage.

3. Apparatus for the surface aeration of liquids, comprising a tank for containing the liquid under treatment; a submerged uptake tube mounted vertically in said tank, a platform above said tank and having a circular opening therein directly above said uptake tube; an annular baseplate mounted on said platform around said opening and adjustable with reference to said uptake tube; a drive unit supported on said baseplate; a dependent spigot on said drive unit; a vertical output shaft extending from said drive unit and through said opening in concentricity with said spigot; a hollow extension detachably coupled to said shaft at a position normally beneath said platform; a circular plate fixed at its centre to said extension; a rotary aerator suspended from said plate in coaxial relation with said shaft and partially submerged in the liquid under treatment; a wheeled carriage movable along said platform and across said opening; lifting tackle suspended from said carriage and attachable to said drive unit to allow said unit to be lifted until said output shaft can be uncoupled from said extension above the level of said platform; and a clamp securable around said extension and adapted to rest upon said baseplate after said extension and associated aerator have been lifted and uncoupled from said output shaft and during removal of the lifted drive unit by movement of said carriage.

4. Apparatus for the surface aeration of liquids, comprising a tank for containing the liquid under treatment; a platform above said tank having a row of spaced circular openings therein; a corresponding number of drive units supported on said platform and respectively located in said openings; a vertical output shaft depending from each drive unit and through the adjacent opening; hollow extensions respectively detachably coupled to said shafts at positions normally beneath said platform; circular plates respectively fixed at their centres to said extensions; rotary aerators suspended one from each of said plates in coaxial relation with said shafts and partially immersed in the liquid under treatment; a wheeled carriage movable along said platform so as to follow said row of openings; lifting tackle suspended from said carriage and attachable to any one of said drive units to allow the same to be lifted until the output shaft thereof can be uncoupled from the associated extension above the level of said platform; and means for permitting movement of said lifting tackle with reference to said carriage so that said lifted drive unit will pass clear of any other such unit still supported on said platform.

References Cited by the Examiner
UNITED STATES PATENTS

| | | | |
|---|---|---|---|
| 2,304,772 | 12/1942 | Allardice et al. | 259—102 |
| 2,802,647 | 8/1957 | Bolton | 259—96 |
| 3,182,972 | 5/1965 | Alsop et al. | 259—107 |
| 3,218,042 | 11/1965 | Ciabattari et al. | 259—95 |

WALTER A. SCHEEL, *Primary Examiner.*

R. W. JENKINS, *Assistant Examiner.*